United States Patent [19]

Leutner et al.

[11] 3,841,907

[45] Oct. 15, 1974

[54] FERROMAGNETIC CHROMIUM DIOXIDE CRYSTALS AND MAGNETIC RECORDING MEDIUM CONTAINING SAME

[75] Inventors: Bernd Leutner, Maxdorf; Matthias Schwarzmann, Limburgerhof; Manfred Ohlinger, Ludwigshafen, all of Germany

[73] Assignee: Badische Anilin and Soda Fabrik Aktiengesellschaft, Ludwigshafen/Rhine, Germany

[22] Filed: Apr. 18, 1972

[21] Appl. No.: 245,271

[30] Foreign Application Priority Data

Apr. 24, 1971 Germany............................ 2120206

[52] U.S. Cl................ 117/234, 252/62.51, 423/607, 117/235, 117/100 B

[51] Int. Cl............................................... C01g 37/02

[58] Field of Search.................. 252/62.51; 423/607; 117/234, 10o B, 235

[56] References Cited

UNITED STATES PATENTS

| | | | |
|---|---|---|---|
| 3,512,930 | 5/1970 | Bottjer et al. | 252/62.51 X |
| 3,585,141 | 6/1971 | Ingersoll | 252/62.51 X |
| 3,586,630 | 6/1971 | Ingersoll | 252/62.51 X |
| 3,686,031 | 8/1972 | Balthis | 252/62.51 X |
| 3,767,580 | 10/1973 | Kitamoto et al. | 252/62.51 |

*Primary Examiner*—Jack Cooper
*Attorney, Agent, or Firm*—Johnston, Keil, Thompson & Shurtleff

[57] ABSTRACT

The invention relates to ferromagnetic chromium dioxide crystals which are particularly suitable as magnetic pigments for magnetic recording media and which are stabilized by sparingly water-soluble metal compounds whose cations form sparingly water-soluble metal chromates (such as lead hydroxide, barium phosphate, lead silicate and calcium sulfate) applied to, and particularly precipitated onto, the surface thereof, and to a process for their production.

2 Claims, No Drawings

FERROMAGNETIC CHROMIUM DIOXIDE CRYSTALS AND MAGNETIC RECORDING MEDIUM CONTAINING SAME

The invention relates to a process for stabilizing ferromagnetic chromium dioxide, stabilized ferromagnetic chromium dioxide crystals and their use for magnetic recording media.

It is known that chromium dioxide crystals having ferromagnetic properties can be used as magnetic pigments for magnetic recording media. They may be prepared by various methods, for example compounds of chromium and oxygen which are pure or which have been modified with metals and which have a ratio of oxygen to chromium of >2:1 may be thermally decomposed into chromium dioxide at superatmospheric pressure according to U.S. Pat. Nos. 2,923,683, 3,034,988 and 3,117,093 or German Printed Application No. 1,270,538 or at atmospheric pressure according to U.S. Pat. No. 3,486,851, or chromium oxides having a ratio of oxygen to chromium of 2:1, as for example chromic oxide, may be oxidized with chromium trioxide or other oxidizing agents to form chromium dioxide (cf. U.S. Pat. No. 3,278,263).

The ferromagnetic properties of chromium dioxide may be favorably influenced by adding metals which occupy the spaces usually occupied by chromium in the crystal lattice of $CrO_2$. For example, according to German Printed Application No. 1,467,328 or German Pat. No. 1,152,932 selenium, tellurium, ruthenium, tin, antimony, titanium, vanadium, manganese, iron, cobalt or nickel may be introduced into the crystal lattice of chromium dioxide as modifying elements. It is also possible for spaces in the crystal lattice normally occupied by oxygen to be occupied for example by fluorine.

In the case of ferromagnetic chromium dioxide the chromium is present in the less stable oxidation stage of this element, namely +4. Chromium dioxide can therefore easily be converted into compounds of higher thermodynamic stability with the oxidation stages +3 and/or +6 and is consquently sensitive to reducing or oxidizing influences. It may even react with the organic compounds of the binder in magnetic recording media, particularly at elevated temperature and high humidity, with the subsequent loss of the magnetic properties. If no reducing or oxidizing agent is present, chromium dioxide may slowly disproportionate into trivalent and hexavalent chromium compounds so that some of the desired properties of chromium dioxide as a magnetic pigment are detrimentally affected.

German Printed Application No. 1,925,541 discloses that the chemical stability of acicular ferromagnetic chromium dioxide particles can be improved by reducing the surface of the particles so that a protective phase of a trivalent chromium compound is formed around the crystals. This however involves a waste of ferromagnetic chromium dioxide because, in order to achieve an adequate protective effect, a certain proportion of tetravalent chromium dioxide is reduced to trivalent chromium compound and thus lost as magnetic pigment.

We have now found that ferromagnetic chromium dioxide crystals, which may have been modified with a foreign element, are substantially resistant to chemical changes and thus retain their magnetic properties when the surface of the chromium dioxide crystals is protected with a sparingly water-soluble metal compound whose cations form sparingly water-soluble metal chromates.

Ferromagnetic chromium dioxide crystals stabilized according to the invention are particularly stable when the amount of sparingly soluble compounds of metals capable of forming sparingly water-soluble metal chromates is about 0.1 to 30 percent of the weight of the chromium dioxide crystals.

Compounds of the elements calcium, strontium, barium, lead, silver and mercury are preferred as sparingly water-soluble metal compounds for the stabilization according to the invention. Sparingly soluble lead compounds such as lead oxide, lead hydroxide, lead phosphate, lead silicate or lead sulfide have proved to be particularly effective. Particularly suitable sparingly soluble salts of the said metals calcium, strontium and barium are the phosphates, silicates and sulfates. The cations of the metal compounds should form metal chromates which are sparingly soluble in water; this can easily be ascertained by reacting metal salts dissolved in water with dissolved alkali metal chromates at a temperature of for example from 20° to 80° C.

Stabilization according to the invention is not limited to the use of inorganic metal compounds. Metal salts of organic carboxylic acids, particularly of alkane carboxylic acids of six to 24 carbon atoms, which are sparingly soluble in water may also be used, for example the lead or mercury salt of 2-ethylhexanoic acid-1.

A crystalline, predominantly acicular chromium dioxide, such as can be prepared for example according to U.S. Pat. No. 3,278,263, is generally used as starting material.

Naturally, a chromium dioxide which has been modified with a foreign element, or a chromium dioxide which has been pretreated for example by a conventional method, for example by reduction of the surface, may also be used.

Application of the sparingly soluble compounds to the crystals of chromium dioxide to be stabilized in advantageously carried out by producing the sparingly soluble compound in a suspension of chromium dioxide crystals in water, for example by varying the pH or by using a precipitant.

Lead salts which are soluble in water such as lead nitrate or lead acetate may be conveniently hydrolyzed to sparingly soluble lead oxide or lead hydroxide by adding bases, for example caustic soda or caustic potash solutions, ammonia, or substances such as urea or urotropine which eliminate bases, so that the lead oxide or hydroxide is so to speak precipitated on the surface of the chromium dioxide crystals. It is conceivable that an additional slight reaction of chromium dioxide to form lead chromate at the surface of the crystal is the cause of an extremely resistant coating.

Lead phosphate, lead silicate and lead sulfide may also be precipitated as sparingly soluble lead compounds by adding appropriate precipitants such as water-soluble phosphate salts, for example disodium hydrogen phosphate, alkali metal silicate solutions or sulfide-containing solutions or hydrogen sulfide.

In another embodiment a stable chromium dioxide is obtained for example by adding chromium dioxide crystals to a suspension of freshly precipitated lead hydroxide and suspending them thoroughly.

Another method of stabilization consists in allowing metal compounds dissolved in the chromium dioxide suspension to react with the chromium dioxide for some time so that sparingly soluble metal chromates form a protective layer on the surface of the crystals.

For example, the chromium dioxide may be suspended for some time (1 minute to 20 minutes) in a 0.1 to 5 percent lead nitrate solution at 60° to 100° C and a pH of about 2 to 7 so that small amounts of chromate situated on the magnetic crystals react to form a layer of lead chromate.

An effective stabilization of the chromium dioxide crystals can be achieved with water-insoluble organic metal compounds such as the metal salts of branched or linear alkanecarboxylic acids of six to 24 carbon atoms which are soluble in organic solvents by bringing the chromium dioxide crystals into an organic phase with dissolved metal salts of fatty acids, particularly of lead or mercury salts, and depositing a protective layer thereon by distilling off the solvent. The organic solvent may be a hydrocarbon such as ligroin, gasoline, cyclohexane, chlorinated hydrocarbons such as chloroform or carbon tetrachloride, or ethers such as diethyl ether or tetrahydrofuran; they naturally should not enter into any reaction with the chromium dioxide.

Compounds of calcium, strontium or barium are conveniently precipitated as phosphates, sulfates or silicates.

As is shown by electron micrographs, the surface of the crystals is coated with the said compounds in the stabilization according to the invention. It is assumed that some of the deposit on the surface of the crystals has reacted to form a sparingly soluble metal chromate. The chromium dioxide used as magnetic pigment is thus provided with a protective layer which is extremely insensitive to external influences without any appreciable loss of magnetic substance having taken place. The coercive force of the crystal powder is not impaired, but the remanence and saturation suffer a slight drop as a result of dilution with non-magnetic material.

As compared with unstabilized ferromagnetic chromium dioxide crystals conventionally used, the ferromagnetic chromium dioxide stabilized according to this invention is distinguished by much greater stability and by a substantially decreased release of chromate which was ascertained as follows:

To control the effectiveness of the stabilization in each case 1 g of stabilized chromium dioxide crystals was shaken at 55° C with 15 ml of distilled water and in each case the amount of chromate in the water was determined after 1, 3 and 6 hours. The analytical method used to ascertain the amount of chromate was a colorimetric determination using diphenyl carbazide or, in the case of higher concentrations of chromate, a potentiometric titration with ferric sulfate solution (cf. Handbuch der analytischen Chemie, Volume VI *bα*, Chromium, W. Fresenius and G. Jander, Springer-Verlag, Berlin, 1958).

In this treatment an unstabilized chromium dioxide gives a yellow solution which contains about 80 mg of $CrO_3$ per liter after 1 hour, about 130 mg of $CrO_3$ per liter after 3 hours and from 170 to 280 mg of $CrO_3$ per liter after 6 hours.

Chromium dioxide stabilized according to the invention may be used as the magnetic component for the production of recording tapes, discs and drums and for magnetic memory cores. In high frequency technology it may be used for attenuators, gyrator elements, electrically operated switches and low loss transformer cores. Other fields of application include focussing magnets, magnetic clutches and thermal-magnetic copying equipment. In all these applications chromium dioxide which has been treated according to the invention exhibits better chemical and ferromagnetic stability than untreated material.

Magnetic recording media may be advantageously prepared with the stable ferromagnetic chromium dioxide according to the invention by conventional methods using prior art binders. Examples of suitable binders are polyurethanes prepared from polyesters containing hydroxyl groups or vinyl chloride or acrylic ester copolymers containing hydroxyl groups and polyisocyanates, copolyamides, copolymers of vinyl chloride and vinyl acetate or vinyl propionate and, if desired, vinyl alcohol, copolymers of vinylidene chloride, for example with vinyl chloride, vinyl acetate, acrylonitrile and/or acrylic esters or mixtures of these binders. Lubricants and other additives may also be used in these recording media. Other suitable additives are specified for example in U.S. Pat. No. 2,418,479.

In the following examples a chromium dioxide powder is used which, prior to stabilization, has a sigma value of 820 gauss $cm^3/g$, a remanence value of 450 gauss $cm^3/g$ and a coercive force of 480 oersteds. Unless otherwise specified, the chromium oxide is made into a suspension with water in a ratio of about 1:20 and mixed for about 5 to 10 minutes in an Ultra-Turrax disperser (manufactured by Janke and Kunkel, Staufen, Germany) to improve suspension. After the pigment has been stabilized, it is filtered off, washed with water and dried at 30° to 120° C and advantageously at subatmospheric pressure, for example at 15 to 30 mm Hg.

The parts and percentages specified in the following examples are by weight unless otherwise specified.

EXAMPLE 1

A solution of 0.46 part of lead nitrate in 5 parts of water is added to an aqueous suspension of 50 parts of chromium dioxide at room temperature. The pH is adjusted to 9 by adding 5 percent aqueous ammonia and the chromium dioxide is filtered off 10 minutes later. After filtration the stabilized magnetic pigment is dried in vacuo at 60° C.

In the chromate test after 6 hours at 55° C the aqueous solution contains only 3 mg of $CrO_3$ per liter as compared with 170 mg in the case of an unstabilized sample.

EXAMPLE 2

A suspension of 100 parts of chromium dioxide in 1,000 parts of water is heated to 63° C by injecting steam. A solution of 17 parts of lead acetate ($Pbac_2.3H_2O$) in 200 parts of water and at the same time a 5 percent ammonia solution are metered into this suspension in the course of 15 minutes in such a way that the pH of the suspension remains at 8.7 to 8.9. The mother liquor is separated while still hot and the chromium dioxide is washed with hot water.

In the chromate test the aqueous suspension exhibits no yellow coloration after 1 hour or even after 3 hours. The solution contains only 2 mg of $CrO_3$ per liter after 6 hours.

EXAMPLE 3

In the course of 15 minutes a solution of 3.5 parts of lead nitrate in 40 parts of water and at the same time a solution of 3.24 parts of the sodium salt of 2-ethylhexanoic acid in 40 parts of water are added to an aqueous suspension of 100 parts of chromium dioxide which has previously been adjusted to pH 8 with aqueous ammonia solution. During the addition the pH is kept at 7.5±0.5 with 10 percent ammonia solution.

In the chromate test after 6 hours at 55° C the concentration of chromium trioxide in the aqueous solution is only 4 mg per liter.

EXAMPLE 4

64.8 parts of 2-ethylhexanoic acid in 600 parts of water is neutralized with 20 percent aqueous caustic soda solution for the production of the sodium salt of 2-ethylhexanoic acid. The aqueous solution of the sodium salt is covered with an equal volume of ligroin (boiling point from 40° to 60° C) and a solution of 70 parts of lead nitrate in 200 parts of water is added with vigorous mixing of the two phases using a disperser. In this method the lead salt of 2-ethylhexanoic acid precipitated in the aqueous phase dissolves in the organic phase and can be decanted from the aqueous phase after the two phases have separated out. 2,000 parts of chromium dioxide is introduced into the ligroin phase, the mixture is suspended and then the solvent is distilled off at 20° C and 20 mm Hg while stirring.

The chromium dioxide treated in this way releases only 5.8 mg of $CrO_3$ per liter in the 6-hour chromate test.

A chromium dioxide prepared in the same way but in which the solvent is not distilled off but the suspension is filtered after having been heated for 5 minutes at 50° C also releases only a very small amount of $CrO_3$ in the 6-hour chromate test, namely 23 mg per liter.

EXAMPLE 5

50 parts of chromium dioxide is suspended in water and 6 parts of disodium hydrogen phosphate ($Na_2HPO_4.12H_2O$) is added to the suspension. 8.27 parts of lead nitrate in the form of a 10 percent aqueous solution is introduced at room temperature in the course of 15 to 20 minutes while stirring and while keeping the pH at 6.0 with 1-normal caustic soda solution.

The stabilized chromium dioxide releases only 20 mg of $CrO_3$ per liter in the 6-hour chromate test.

Corresponding values are obtained with chromium dioxides which have been treated with one-third of the above mentioned amount of reagent or which have been treated at 60° C.

EXAMPLE 6

50 parts of chromium dioxide is suspended in water, heated up to 60° c with steam and then 3.9 g of sodium waterglass (26 to 27 percent of $SiO_2$; ratio of $SiO_2$ to $Na_2O = 3.28:1$). A 10 percent lead nitrate solution containing 3 parts of lead nitrate is added in the course of fifteen minutes, the pH slowly falling to 5 to 7. The suction-filtered product releases 20 mg of $CrO_3$ per liter in the 6-hour chromate test.

EXAMPLE 7

50 parts of chromium dioxide is suspended in water, heated up to 60° C with steam and 6.35 parts of trisodium phosphate ($Na_3PO_4.12H_2O$) is added. 4.8 parts of barium chloride ($BaCl_2.2H_2O$) in the form of a 10 percent aqueous solution is added slowly and uniformly to this suspension. The pH is prevented from falling into the acid region by adding 5 percent caustic soda solution. The stabilized chromium dioxide releases only 3 mg of $CrO_3$ per liter in the 6-hour chromate test.

EXAMPLES 8 and 9

50 parts of chromium dioxide is suspended in water, then 5.2 parts of sodium sulfate is added followed at 40° C by 8.65 parts of calcium nitrate ($Ca(NO_3)_2.4H_2O$) dissolved in a little water. 10 minutes later the whole is filtered.

In an analogous manner 4.57 parts of sodium sulfate followed by 7.85 parts of barium chloride dissolved in water are added to a suspension of 50 parts of chromium dioxide. The whole is stirred for 5 minutes at 22° C and filtered. The amounts of $CrO_3$ released by both of these stabilized chromium dioxide pigments in the chromate test after 3 and 6 hours are from 40 to 60 percent less than those released by untreated chromium dioxide samples.

EXAMPLE 10

2.5 parts of the mercury salt of 2-ethylhexanoic acid is dissolved in 180 parts by weight of ligroin (boiling point from 40° to 60° C). 50 parts of chromium dioxide is added to this solution, suspended for 10 minutes and the ligroin is distilled off at 20 mm Hg. The chromate test reveals that the resulting chromium dioxide releases about 50 percent less chromate than untreated comparative samples.

EXAMPLE 11

7.43 parts of lead nitrate in the form of a 20 percent aqueous lead nitrate solution is rapidly combined with a solution of 1.8 parts of sodium hydroxide in 40 parts of water to precipitate lead hydroxide. After dilution with 450 parts of water, 50 parts of chromium dioxide is introduced into this suspension of freshly precipitated lead hydroxide, suspended thoroughly and filtered off after a residence time of about 10 minutes.

The treated chromium dioxide releases 50.4 mg of $CrO_3$ per liter in the 6-hour chromate test.

EXAMPLE 12

50 parts of chromium dioxide is suspended in 600 parts of water in which 1.38 parts of lead nitrate have been dissolved. While maintaining a pH of from 2.5 to 3.5 with 1-normal caustic soda solution, hydrogen sulfide is passed into this suspension until dissolved lead ions can no longer be detected in the liquid with 1 percent aqueous sodium sulfide solution. 10 minutes are required for the quantitative precipitation of lead sulfide.

The chromium dioxide obtained releases less than 10 mg of chromium trioxide per liter in the 6-hour chromate test.

EXAMPLE 13

A magnetic tape is prepared by a conventional method using a chromium dioxide stabilized according to Example 1 as the magnetic pigment. The binder used is a soluble reaction product of hydroxyl-containing polyester derived from adipic acid and 1,4-butanediol with 4,4′-diisocyanato-diphenylmethane dissolved in a mixture of equal parts by volume of tetrahydrofuran and toluene. The base film is made of polyethylene terephthalate. The thickness of the magnetic coating is 5 microns.

62.5 $cm^2$ of this magnetic tape is shaken for 8 hours with distilled water at a temperature of 70° C. The $CrO_3$ content of the aqueous solution (determined by the above-mentioned colorometric method) is substantially lower than the $CrO_3$ contents of comparative solutions obtained with magnetic tapes which have been prepared in the same manner but which have untreated chromium dioxide as the magnetic pigment.

We claim:

1. Stabilized ferromagnetic chromium dioxide which comprises chromium dioxide crystals in which the surface of said crystals is coated with from 0.1 to 30 percent by weight of the chromium dioxide of a substantially water-insoluble compound selected from the group consisting of 1. the oxides, hydroxides, sulfides and silicates of divalent lead;
2. the sulfates and silicates of calcium, strontium and barium;
3. the salt of an alkane carboxylic acid having six to 24 carbon atoms and a metal cation selected from the group consisting of divalent lead and mercury; and
4. the chromates of divalent lead.

2. A magnetic recording medium containing as the magnetic pigment ferromagnetic chromium dioxide crystals coated with from 0.1 to 30 percent by weight of the chromium dioxide of a substantially water-insoluble compound selected from the group consisting of 1. the oxides, hydroxides, sulfides and silicates of divalent lead;
2. the sulfates and silicates of calcium, strontium and barium;
3. the salt of an alkane carboxylic acid having six to 24 carbon atoms and a metal cation selected from the group consisting of divalent lead and mercury; and,
4. the chromates of divalent lead.

* * * * *